United States Patent
Klink

(10) Patent No.: US 6,704,279 B2
(45) Date of Patent: Mar. 9, 2004

(54) CIRCUIT ARRANGEMENT FOR PROVIDING A BACK-UP CIRCUIT FOR TRANSMISSION DEVICES IN RING ARCHITECTURES THAT ROUTE MPLS PACKETS

(75) Inventor: Joachim Klink, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/204,976

(22) PCT Filed: Jan. 12, 2001

(86) PCT No.: PCT/EP01/00434

§ 371 (c)(1),
(2), (4) Date: Aug. 28, 2002

(87) PCT Pub. No.: WO01/65776

PCT Pub. Date: Sep. 7, 2001

(65) Prior Publication Data

US 2004/0013085 A1 Jan. 22, 2004

(30) Foreign Application Priority Data

Feb. 29, 2000 (EP) ............................................. 00104147

(51) Int. Cl.[7] ............................................... H04L 12/26
(52) U.S. Cl. ................................... 370/225; 370/395.5
(58) Field of Search ............................... 370/216–228, 370/389, 395.41–395.52, 406; 714/4; 340/825.01–825.04; 709/239–241, 249

(56) References Cited

U.S. PATENT DOCUMENTS 6,236,640 B1 * 5/2001 Klink ......................... 370/224
6,530,032 B1 * 3/2003 Shew et al. ................... 714/4
2002/0181485 A1 * 12/2002 Cao ............................ 370/389

FOREIGN PATENT DOCUMENTS

EP        857002 A2 * 8/1998 ........... H04Q/11/04
EP        857003 A2 * 8/1998 ........... H04Q/11/04

OTHER PUBLICATIONS

George Sallow, MPLS advantages for traffic engineering, IEEE, pp. 54–57.*

Thomas Chen, Reliable Services in MPLS, IEEE, pp. 58–62.*

Daniel Awduche, MPLS and traffic engineering in IP networks, IEEE, pp. 42–47.*

Sun, "Support IP on ATM network: overview " computer communications, NL, elseviersicience publisher, bv Ansterdam, Br 21, Nr 11, Aug. 1998.*

* cited by examiner

Primary Examiner—Steven H. D Nguyen
(74) Attorney, Agent, or Firm—Morrison & Foerster LLP

(57) ABSTRACT

In prior art, the provision of back-up circuits for ATM cells in ring-type structures is efficiently controlled using linear structures. According to the invention, this function is extended to ring-type MPLS network architectures as follows: linear MPLS structures are formed into a ring-type MPLS structure and two unidirectional MPLS connections which respectively connect the same switching devices and run in opposite directions are logically associated to one another, whereby the operating link and the back-up link are routed via different physical paths.

18 Claims, 4 Drawing Sheets

CIRCUIT ARRANGEMENT FOR PROVIDING A BACK-UP CIRCUIT FOR TRANSMISSION DEVICES IN RING ARCHITECTURES THAT ROUTE MPLS PACKETS

CLAIM FOR PRIORITY

This application claims priority to International Application No. PCT/EP01/00434 which was published in the German language on Sep. 7, 2001.

TECHNICAL FIELD OF THE INVENTION

The invention relates to a circuit arrangement for the protection switching of transmission devices in ring architectures carrying MPLS packets.

BACKGROUND OF THE INVENTION

A circuit arrangement for the protection switching of transmission devices in ring architectures is known from German patent application DE 197 039 93.6.

This circuit arrangement relates to transmission devices via which information is conducted in accordance with an asynchronous transfer mode (ATM). In this arrangement, a transmission device for the bidirectional transmission of digital signals is provided in which two switching devices acting as terminal stations are connected to one another via a multiplicity of operating links and one protection link. The two terminal stations in each case contain monitoring devices for detecting transmission disturbances. A switching system, which can be controlled by a monitoring device, connects a receiving device to the operating link in a first switching state and to the protection link in a second switching state.

The disadvantageous factor of this circuit arrangement is that it relates exclusively to ATM transmission devices. In the Internet, information is supplied to the receiving subscriber via a multiplicity of network nodes which can be constructed as routers. Between the routers, MPLS networks can be arranged. However, there is no mention whatsoever of MPLS networks in the known circuit arrangement.

SUMMARY OF THE INVENTION

The invention relates to a circuit arrangement in such a manner that information which is transmitted in accordance with an Internet protocol can be transmitted with great reliability over a multiplicity of network nodes.

One advantageous embodiment in the invention is that a multiplicity of linear transmission sections formed from MPLS switching devices are joined to form a ring system. In this arrangement, a transmission section is formed by an operating link and/or a protection link. Furthermore, two oppositely directed unidirectional MPLS connections which in each case connect the same MPLS switching devices are logically associated with one another, and operating link and protection link are conducted via different physical routes. The MPLS switching devices are constructed as label switched routers. This is associated with the advantage that in the case of a fault on the operating link, MPLS connections can be maintained efficiently in such evolved ring systems.

BRIEF DESCRIPTION OF THE DRAWINGS

In the text which follows, the invention will be explained in more detail with reference to an exemplary embodiments.

In the figures.

DETAILED DESCRIPTION OF THE PREFERRED EMBODIMENTS

Figure 1:
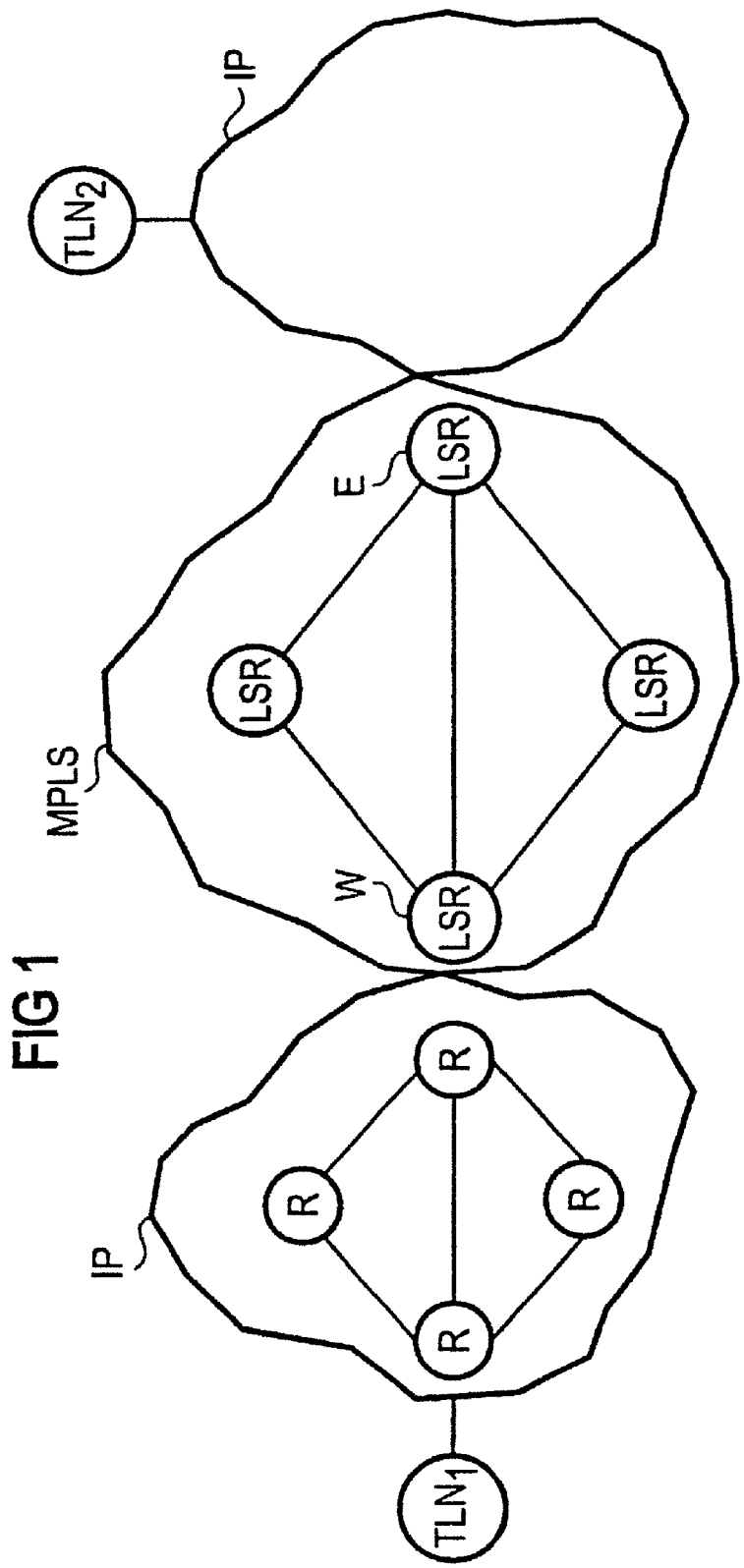
FIG. 1 shows an MPLS network linked into the Internet.

FIG. 1 shows by way of example how information coming from a subscriber TLN1 is supplied to a subscriber TLN2. The transmitting subscriber TLN1 is connected to the Internet network IP through which the information is conducted in accordance with an Internet protocol such as, e.g., the IP protocol. This protocol is not a connection-oriented protocol. The Internet network IP exhibits a multiplicity of routers R which can be intermeshed with one another. The receiving subscriber TLN2 is connected to a further Internet network IP. Between the two Internet networks IP, an MPLS (Multiprotocol Packet Label Switching) network is inserted through which information is switched through in a connection-oriented manner in the form of MPLS packets. This network exhibits a multiplicity of mutually intermeshed routers. In an MPLS network, these can be so-called label switched routers (LSR). One of the routers is designated as transmitting device W and another one is designated as receiving device E.

MPLS packets in each case have a header and an information section. The header is used for accommodating connection information whereas the information section is used for accommodating user information. The user information used is IP packets. The connection information included in the header is arranged as MPLS connection number. However, this has validity in the MPLS network. When thus an IP packet from the Internet network IP penetrates into the MPLS network, the header valid in the MPLS network is appended to it. This includes connection information which predetermines the path of the MPLS packet in the MPLS network. If the MPLS packet leaves the MPLS network, the header is removed again and the IP packet is routed further as determined by the IP protocol in the Internet network IP following it.

Figure 2:
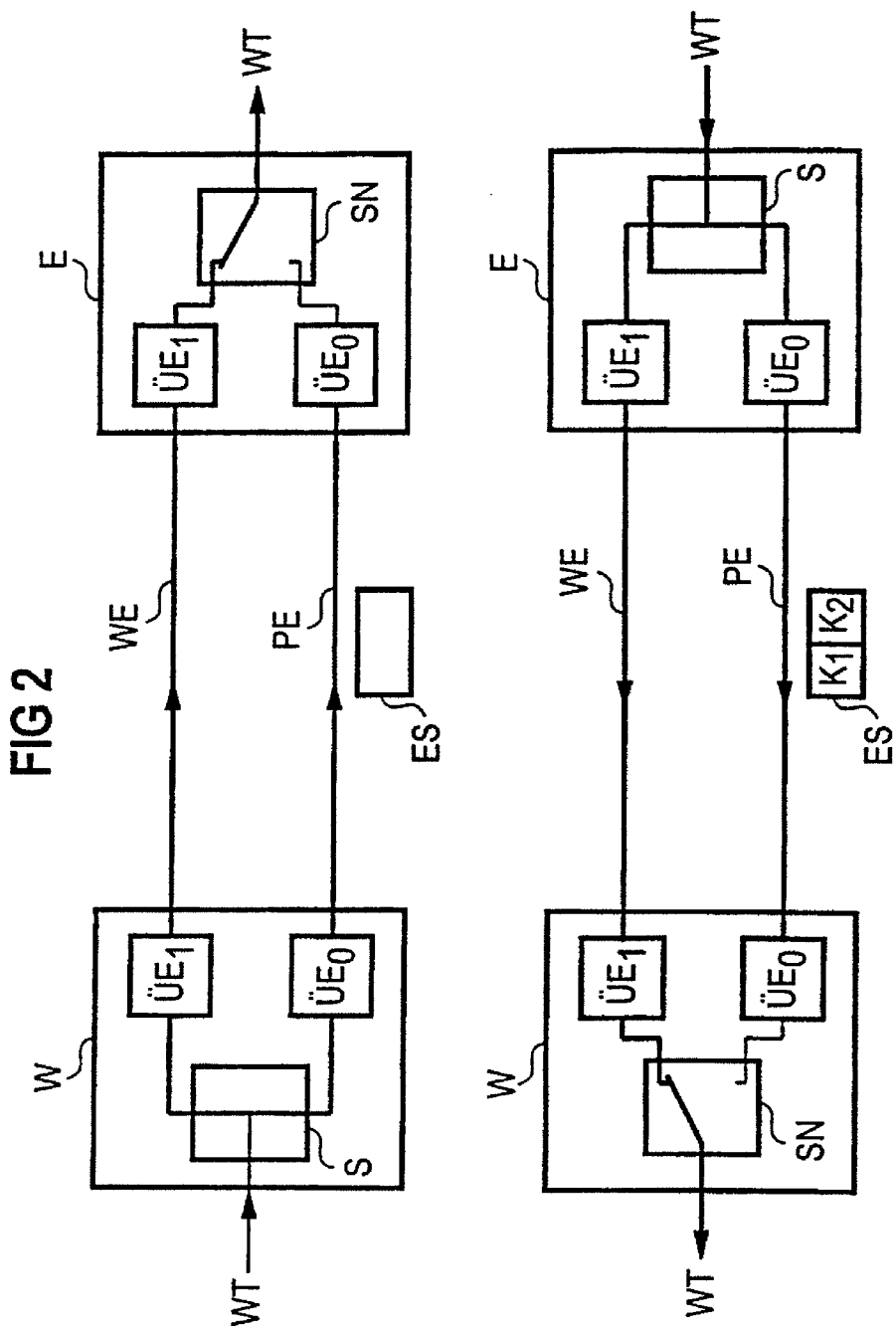
FIG. 2 shows a configuration for transmitting MPLS packets in a linear 1+1 structure.

FIG. 2 shows by way of example two nodes of an MPLS network in a linear configuration which are in each case arranged as switching device W, E. In the present exemplary embodiment, it is assumed that these switching devices are MPLS cross-connect switching devices. Using switching devices of such a construction, however, does not signify a restriction of the invention and other switching devices such as, e.g., ATM. switching devices can similarly be used. In FIG. 2, MPLS (Multiprotocol Label Switched) packets are then to be transmitted from the switching device constructed as label switched router W to the switching device constructed as label switched router E.

FIG. 2 shows a linear 1:1 structure. It also shows the case of bidirectional transmission. The transmission of MPLS packets in the MPLS network is defined as being unidirectional. Accordingly, a total of two "connections" (one for the forward direction and one for the reverse direction) should be set up for the forward and reverse transmission of MPLS packets, belonging to a connection WT, between the label switched router W and the label switched router E in the case of bidirectional transmission. A "connection" in the MPLS network is called a Label Switched Path (LSP).

The label switched routers W, E are connected to one another via an operating link (WORKING ENTITY) and one protection link PE (PROTECTION ENTITY). The operating link WE may also optionally be constructed from a plurality of operating links. Furthermore, switching systems S (BRIDGE) are shown via which the incoming MPLS packets are received and the operating links WE are transmitted toward the label switched router E. Furthermore, FIG. 2 shows selection devices SN, the task of which is to supply the MPLS packets transmitted via the operating link WE to the output of the label switched router E. According to the present exemplary embodiment, the selection devices SN are constructed as switching network. The switching network SN is arranged both in the label switched router W and in the label switched router E.

Furthermore, monitoring devices $\ddot{U}E_0$, $\ddot{U}E_1$, (PROTECTION DOMAIN SINK, PROTECTION DOMAIN SOURCE) which monitor the state or the quality of the MPLS packets transmitted via the operating links WE are shown in the two label switched routers W, E. For example, the MPLS packets of the connection with the number 1 $WT_1$, before they are transmitted via the operating link WE toward the label switched router E, are provided with control information in the monitoring device $\ddot{U}E_1$ of the label switched router W, which control information is extracted and checked by the monitoring device $\ddot{U}E_1$ of the receiving label switched router E. Using this control information, it is then possible to determine whether the transmission of the MPLS packet has been correct or not. In particular, a total failure (SIGNAL FAIL FOR WORKING ENTITY) of the operating link WE can be determined here. Similarly, degradations in the transmission quality (SIGNAL DEGRADE) however can also be determined by using known methods.

The monitoring devices $\ddot{U}E_1$ terminate the operating link WE at both ends. Other monitoring devices $\ddot{U}E_0$ are arranged at both ends of the protection link PE. In the case of a fault, this is to be used as transmission link for the operating link WE taken out of operation. Furthermore, protection switching protocols ES are transmitted via this link so that the integrity of the protection link has top priority.

In each of the label switched routers W, E, central controllers ZST are also arranged. These contain in each case local and global priority tables in which the status and priority of the local label switched router W (local priority table) and the status and priority of the local and of the remaining label switched router E (global priority table) are conducted. The introduction of the priorities has the result that when a number of protection switching requests occur at the same time, that operating link which is to be protection-switched when a number of operating links are present is specified. Similarly, the protection switching requests are prioritized in the priority tables. Thus, for example, there is a high-priority request from a user. Since this protection switching request is assigned a high priority, it is thus controlled with preference. A protection switching request which is controlled by one of the operating links and is assigned a lower priority will thus be rejected.

The central controllers ZST of the label switched routers W, E exchange information in a protection switching protocol ES. This protocol is transmitted via the protection link PE and extracted by the associated monitoring device $\ddot{U}E_0$ from the respective receiving label switched router, and supplied to the relevant central controller ZST. Furthermore, the central controller ZST ensures that the switching devices S are appropriately driven in the case of a fault.

In the protocol ES, information $K_1$, $K_2$ is stored. The former is information relating to the protection switching request generated, while the latter is information relating to the current states of the switching systems. The protocol ES is in each case exchanged between the two label switched routers W,E when a protection switching request is generated. In a special embodiment of the invention, there is provision for the protocol ES to be transmitted cyclically between the two label switched routers W, E.

Figure 3:
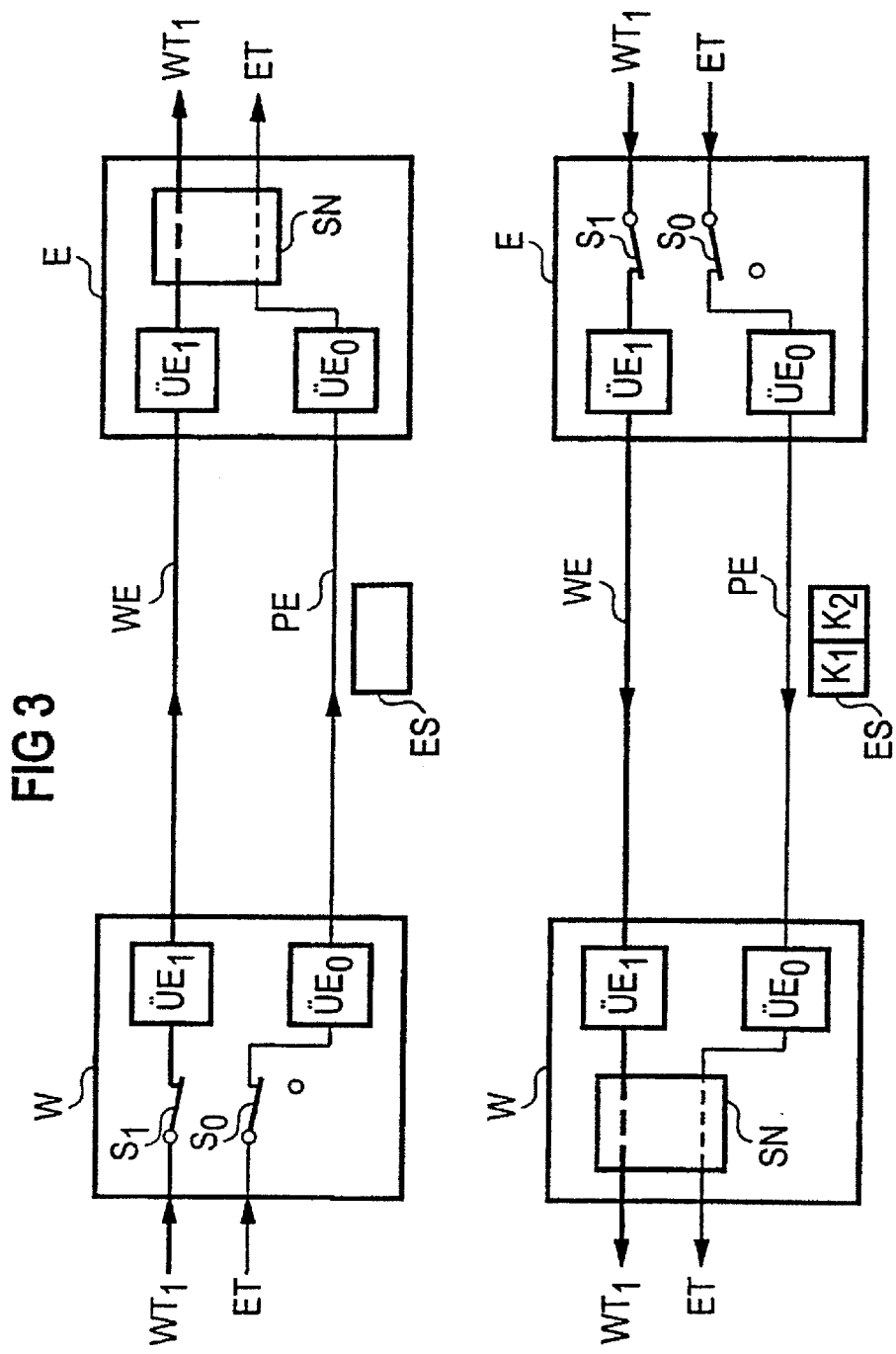
FIG. 3 shows a configuration for transmitting MPLS packets in a linear 1:1 structure.

FIG. 3 shows a further linear structure by means of which MPLS packets can be protection-switched. This is a1:1 structure. The difference compared with the 1+1 structure shown in FIG. 2 is that the bridge devices S shown there are constructed as switching devices $S_0$, $S_1$. The selection device SN is also constructed as switching network here, as in FIG. 2. The MPLS packets conducted via the protection link PE are supplied to this switching network. Here, the logical MPLS connection number is taken from the packet header, evaluated and switched through the switching network. In this case, there is thus no driving of switching systems in the receiving switching device. The two label switched routers W, E according to FIG. 3 also contain central controllers (not shown) with local and global priority tables.

The protection link PE can remain unused during this time. If necessary, however, it is also possible to supply special data (EXTRA TRAFFIC) to the label switched router E during this time.

The protocol ES is arranged differently from the first case. Thus, further information is stored here in addition to the information regarding the protection switching request generated, already discussed in the first case. This is information with respect to the current states of the switching devices $S_0$, $S_1$. In the case of a fault, the switching devices $S_0$, Smust be correspondingly controlled. The protocol is in each case exchanged between the two label switched routers W, E when the protection switching request is generated. In a special embodiment of the invention, it is provided to transmit the protocol ES cyclically between the two label switched routers W, E.

Figure 4:
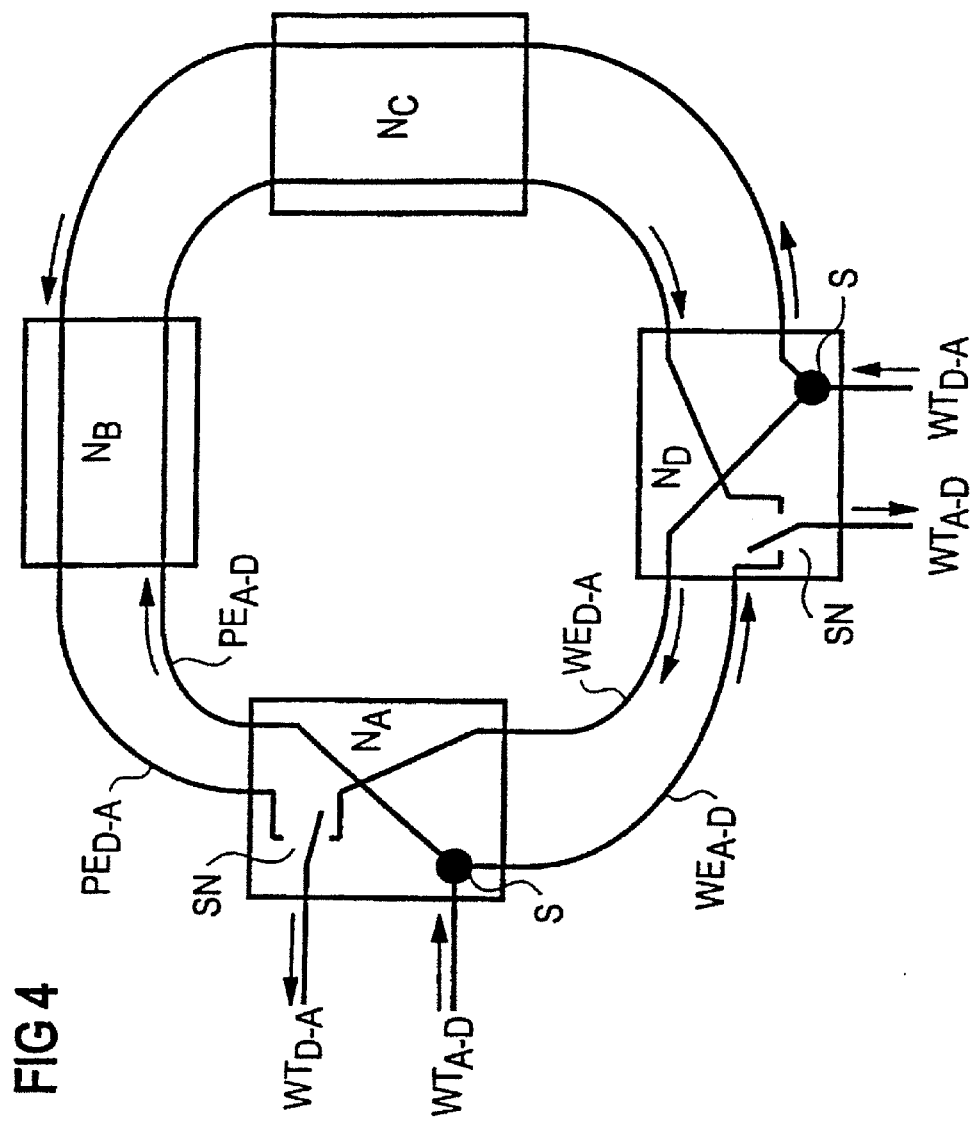
FIG. 4 shows the circuit arrangement according to the invention.

FIG. 4 shows the circuit arrangement according to the invention (dedicated protection). Dedicated protection means that the bandwidth per MPLS switched path is permanently reserved both on the operating link WE and on the protection link PE. The label switched routers are connected in such a manner that a closed ring is produced. According to the present exemplary embodiment, this ring is to be configured from linear connection elements, as shown according to FIG. 2 or FIG. 3. According to the present exemplary embodiment described in FIG. 4, the ring is to be formed from the linear 1+1 structures shown in FIG. 2 without this being intended to indicate a preference for this structure.

FIG. 4 shows label switched routers $N_A$, $N_B$, $N_C$ and $N_D$. Two of these label switched routers in each case terminate transmission sections. Using the example of the label switched routers $N_A$ and $N_D$, these are the connection elements $WE_{A-D}$ and $WE_{D-A}$. Using the example of the label switched routers $N_A$ and $N_B$, $N_C$ or $N_C$, $N_D$, these are the connection elements $PE_{A-D}$ and $PE_{D-A}$.

According to FIG. 4, each of these label switched routers exhibits a bridge device S and a selection device SN. The label switched routers are intended to be connected in such a manner that the respectively active operating links $WE_{A-D}$ and $WE_{D-A}$ are arranged between the label switched routers $N_A$ and $N_D$. The MPLS packets arriving via the connection $WT_{A-D}$ and $WT_{D-A}$ are then conducted via these operating links. In contrast, the protection links are conducted from the label switched router $N_A$ via further label switched routers $N_B$, $N_C$ to the label switched router $N_D$, where the MPLS packets leave the ring in order to be supplied to other devices.

Furthermore, the ring formed by the label switched routers is arranged to be bidirectional in FIG. 4.

The reverse direction of the connection $WT_{A-D}$ is formed by the connection $WT_{D-A}$. To obtain a better understanding, it should be noted that both connections are dealt with separately even though this is a bidirectional connection. An essential factor is that in each case exactly one protection link is allocated to the respective operating link. Thus, the protection link $PE_{A-D}$ is allocated to the operating link $WE_{A-D}$ and the protection link $PE_{D-A}$ is allocated to the operating link $WE_{D-A}$ acting as reverse direction. Furthermore, a case of unidirectional transmission is also possible as an embodiment of the configuration disclosed in FIG. 4.

Furthermore, monitoring devices—not shown in FIG. 4—are arranged in the individual label switched routers. These in each case terminate the operating links $WE_{A-D}$ and $WE_{D-A}$ and the protection links $PE_{A-D}$ and $PE_{D-A}$. Furthermore, MPLS "connections" (label switched paths) conducted via the same physical path are logically combined to form a group and two protection switching connections are created for this group. The first of these protection switching connections is conducted via the operating link WE (MPLS protection switching LSP (label switched path)) as a result of which it is conducted via the same physical path between the label switched routers W and E as all associated individual connections. The second of these protection switching connections is set up via the protection link PE.

In the group protection switching method, the two protection switching connections are now monitored for failures and disturbances in the monitoring devices $ÜE_1$, $ÜE_0$. The individual connections are no longer monitored. In the case of a protection switching request, the priority-controlled protection switching decision is made in the local priority logic, as before. In the protection switching case, however, individual connections belonging to a group are jointly switched over by the switching device SN. During this process, a single protection switching protocol needs to be run over the protection link PE.

An advantageous factor is that a multiplicity of individual connections can be monitored and protection-switched by a single protection switching connection and a single protection switching protocol in order to thus be able to respond appropriately to the fault cases occurring most frequently in practical operation. Furthermore, one protection switching protocol is entered in the local priority table. This has the advantage that the protection switching protocol is transmitted once in the case of a fault in an operating link. This assumes that otherwise it would be necessary to transmit one protection switching protocol per MPLS path number. However, this would lead to a dynamic loading of the ring due to the multiplicity of MPLS connections. Since, however, a plurality of connections having the same MPLS connection number use the same transmission section and, as a rule, a possible disturbance affects the complete transmission section, logical grouping of the MPLS connection number to form a logical group number is advantageous.

In the text which follows, it will be assumed that the connection $WT_{A-D}$ requires that the associated MPLS packets are supplied to the ring via the label switched router $N_A$ and leave it again via the label switched router $N_D$. In this case, the MPLS packets belonging to the connection $WT_{A-D}$ thus supplied to the bridge device S arranged in the label switched router $N_A$. Since this is permanently set, the MPLS packets are supplied to the label switched router $N_D$ both via the operating link $WE_{A-D}$ and via the protection link $PE_{A-D}$ and leave the ring there.

In the trouble-free case, i.e. when there is no operating failure on the active operating link, the MPLS packets are routed directly to the label switched router $N_D$ from the label switched router $N_A$. If, however, an operating failure occurs here, this is determined by the monitoring device arranged in the receiving label switched router. In the present case, this is to be the label switched router $N_D$. The latter thereupon immediately supplies the protection switching protocol via the associated protection link $PE_{A-D}$ to the transmitting label switched router, that is to say label switched router $N_A$. At the same time, the selection device SN is controlled into the operating state which accepts MPLS packets via the protection link $PE_{A-D}$.

The monitoring devices also check the operating state on the protection links. If, for example, MPLS packets are transmitted via the operating link-$WE_{A-D}$ and the receiving label switched router, that is to say label switched router $N_D$, determines a case of a fault on the associated protection link $PE_{A-D}$, the transmitting label switched router $N_A$ is informed of this via information stored in the protection switching protocol. This prevents a changeover to a faulty protection link $PE_{A-D}$ in the case of an additional fault on the active operating link $WE_{A-D}$.

According to the invention, the protection switching protocol ES is exchanged when faults occur, but a cyclic exchange can also be controlled. Similarly, the protection switching protocol can be exchanged in a connection-oriented manner per MPLS connection number. In this case, however, it should be considered that the ring is additionally loaded dynamically in these cases. The advantageous factor is, however, that it is possible to deal with connection-oriented faults with respect to the MPLS connection number by means of such a procedure. Using the preferred embodiment of group protection switching, it is possible to deal with the case of a fault on the route which occurs most frequently.

Finally, it should be noted that, although the ring is configured from linear 1+1 structures in the present exemplary embodiment, using a 1:1 structure according to FIG. 3 brings further advantages. Although the protection switching protocol is more complex in this case, it is possible here to transmit special data via the protection link during the trouble-free time on the operating link. The special data used can be control data of a general type. According to the invention, the special data can also be special traffic data.

The special data transmitted via the protection link can also be low-priority traffic which is transmitted in the network when there are sufficient resources. In this case, the low-priority traffic is then automatically displaced by protection switching of the high-priority traffic. In this case, in the protection switching case, the special data are not displaced by changing over the switching device $S_0$ in FIG. 2, but rather by prioritizing the high-priority traffic with respect to the low-priority special data in each transmission device.

The operating and protection links WE and PE must be set up before start-up. For this purpose, connections must be set up (configured) between the label switched routers W and E and, if necessary, at intermediate transmission devices.

These connections are usually set up by TMN (telecommunication management network) but can also be set up by means of an MPLS signaling protocol. For this purpose, the path of the operating and protection link is established by signaling. In addition, bandwidth is reserved in the transmission devices via the signaling protocol so that the transmission of the information via the operating link and protection link is ensured.

What is claimed is:

1. A circuit arrangement for the protection switching of transmission devices, comprising:

at least two switching devices which in each case terminate a transmission section formed of operating links and/or protection links, and between which information is exchanged over the transmission section, wherein
in the case of a fault on the relevant transmission section, the information transmitted over the section is diverted to the protection link in accordance with priority criteria and logical connection information,
the information is linked into MPLS packets, such that two oppositely directed unidirectional MPLS connections are logically associated with one another, the two oppositely directed MPLS connections in each case connecting the same switching devices, and
a number of linear transmission sections are joined together so that a ring line system is formed, wherein operating and protection links are conducted via different physical paths, and group protection switching provided in the MPLS connections conducted via the same physical path are logically combined to form a group, and for the group formed at least two protection switching connections are generated, in each case one of the protection switching connections being set up via an operating link and another one of the protection switching connections being set up via the protection link, and the connections conducted via the at least one operating link and the connections conducted via the protection link are set up via an MPLS signaling protocol which also reserves bandwidth in the transmission devices and specifies the path of the operating link and of the protection link.

2. The circuit arrangement as claimed in claim 1, wherein a unidirectional ring line system is formed by using unidirectional switching devices, as a result of which there is no logical association between the two oppositely directed unidirectional MPLS connections.

3. The circuit arrangement as claimed in claim 1, wherein a protection link is allocated to the operating link and in each case a priority is assigned to both links.

4. The circuit arrangement as claimed in claim 1, wherein the protection switching case, a protection switching request is generated to which other priorities are assigned.

5. The circuit arrangement as claimed in claim 1, wherein the logical connection information is the MPIS connection number.

6. The circuit arrangement as claimed in claim 1, wherein the logical connection information of an MPLS connection is the number of an MPLS connection group which is f formed from a plurality of MPLS connections.

7. The circuit arrangement as claimed in claim 1, wherein local a and global priority tables are provided in which the or der of rank of the priorities is specified .

8. The circuit arrangement as claimed in claim 1, wherein when a protection switching request arrives in the receiving switching device, a protection switching protocol is generated which is supplied once to the transmitting switching device via the protection link.

9. The circuit arrangement as claimed in claim 1, wherein a total failure and degradation of an operating link can be determined in the monitoring device of the receiving switching device.

10. The circuit arrangement as claimed in claim 1, wherein the switching devices are constructed as MPLS cross-connect switching systems.

11. The circuit arrangement as claimed in claim 1, wherein the protection switching is effected by driving a switching device included in the transmitting switching device and by using a selection device arranged in the receiving switching device.

12. The circuit arrangement as claimed in claim 1, wherein special data are transmitted via the protection link at times free of operating disturbances.

13. The circuit arrangement as claimed in claim 1, wherein the special data are in the form of low-priority traffic which is automatically displaced in the case of protection switching of the high-priority traffic.

14. The circuit arrangement as claimed in claim 1, wherein the selection device is constructed as a switching network and/or as a simple switching element.

15. The circuit arrangement as claimed in claim 1, wherein the switching device arranged in the transmitting switching device can be set permanently.

16. The circuit arrangement as claimed in claim 1, wherein the protection switching protocol is exchanged cyclically between the transmitting switching device and the receiving switching device.

17. A circuit arrangement for the protection switching of transmission devices, comprising:

at least two switching devices which in each case terminate a transmission section formed of operating links and/or protection links, and between which information is exchanged over the transmission section, wherein
in the case of a fault on the relevant transmission section, the information transmitted over the section is diverted to the protection link in accordance with priority criteria and logical connection information,
the information is linked into MPLS packets, such that two oppositely directed unidirectional MPLS connections are logically associated with one another, the two oppositely directed MPLS connections in each case connecting the same switching devices, and
a number of linear transmission sections are joined together so that a ring line system is formed, wherein operating and protection links are conducted via different physical paths, and group protection switching is provided such that MPLS connections conducted via the same physical path are logically combined to form a group, and for the group formed at least two protection switching connections are generated, in each case one of the protection switching connections being set up via an operating link and another one of the protection switching connections being set up via the protection link.

18. The circuit arrangement as claimed in claim 17, wherein in the case where group protection switching is provided, the monitoring devices monitor the at least two protection switching connections.

* * * * *